United States Patent
Hill

(10) Patent No.: US 9,394,718 B1
(45) Date of Patent: Jul. 19, 2016

(54) PORTABLE ICE FISHING AND CAMPING SHELTER

(71) Applicant: Curt J. Hill, Warba, MN (US)

(72) Inventor: Curt J. Hill, Warba, MN (US)

(*) Notice: Subject to any disclaimer, the term of this patent is extended or adjusted under 35 U.S.C. 154(b) by 0 days.

(21) Appl. No.: 14/658,454

(22) Filed: Mar. 16, 2015

(51) Int. Cl.
| | |
|---|---|
| *E04H 15/06* | (2006.01) |
| *B60P 3/32* | (2006.01) |
| *E04H 15/00* | (2006.01) |
| *A01K 97/01* | (2006.01) |
| *A01K 99/00* | (2006.01) |
| *E04H 15/34* | (2006.01) |

(52) U.S. Cl.
CPC .............. *E04H 15/001* (2013.01); *A01K 97/01* (2013.01); *A01K 99/00* (2013.01); *B60P 3/32* (2013.01); *E04H 15/06* (2013.01); *E04H 15/34* (2013.01)

(58) Field of Classification Search
CPC ....... E04H 15/06; E04H 15/001; E04H 15/02; A01K 97/01; B60P 3/32; B60R 9/06; B60R 9/10
USPC .............. 135/88.08, 88.1, 88.13, 88.15, 132, 135/133, 143, 151, 148–149, 901; 296/156, 296/158, 163, 173; 280/491.1, 656; 224/519, 520, 499
See application file for complete search history.

(56) References Cited

U.S. PATENT DOCUMENTS

| | | | | | |
|---|---|---|---|---|---|
| 4,239,247 | A | * | 12/1980 | Hinz | E04H 15/001 135/133 |
| 5,375,902 | A | * | 12/1994 | Church | B60P 3/341 296/169 |
| 6,017,081 | A | * | 1/2000 | Colby | B60P 3/341 296/168 |
| 6,179,368 | B1 | * | 1/2001 | Karlsson | B60P 3/341 135/88.13 |
| 6,439,645 | B1 | * | 8/2002 | Pedersen | E04H 15/06 135/88.05 |
| 6,802,327 | B2 | | 10/2004 | Koss | |
| 7,832,608 | B1 | * | 11/2010 | Bauer, Jr. | B60R 9/06 244/499 |
| 8,079,380 | B2 | * | 12/2011 | Engstrom | E04H 15/001 135/133 |
| D709,805 | S | * | 7/2014 | Hill | D12/162 |
| 2006/0107983 | A1 | * | 5/2006 | Froncek | E04H 15/001 135/88.15 |
| 2006/0238005 | A1 | | 10/2006 | Walter et al. | |
| 2012/0211042 | A1 | * | 8/2012 | Richter | E04H 15/001 135/143 |

* cited by examiner

*Primary Examiner* — Winnie Yip
(74) *Attorney, Agent, or Firm* — Dennis L. Thomte; Thomte Patent Law Office LLC

(57) ABSTRACT

A portable ice fishing and camping shelter which may be secured to either the front of a vehicle or the back of the vehicle. The shelter includes a horizontally disposed base frame which is secured to the hitch receiver of the vehicle so as to be elevated above the ground. One or more seats are positioned on the base frame. A shelter assembly is pivotally secured to the base frame and is movable between collapsed and shelter positions. A flexible cover is mounted on the shelter assembly. A front rest is mounted on the base frame which includes stabilizers thereon. A cargo transport bracket may be secured to the base frame, when the shelter assembly is in the collapsed position, for transporting cargo above the collapsed shelter assembly.

23 Claims, 11 Drawing Sheets

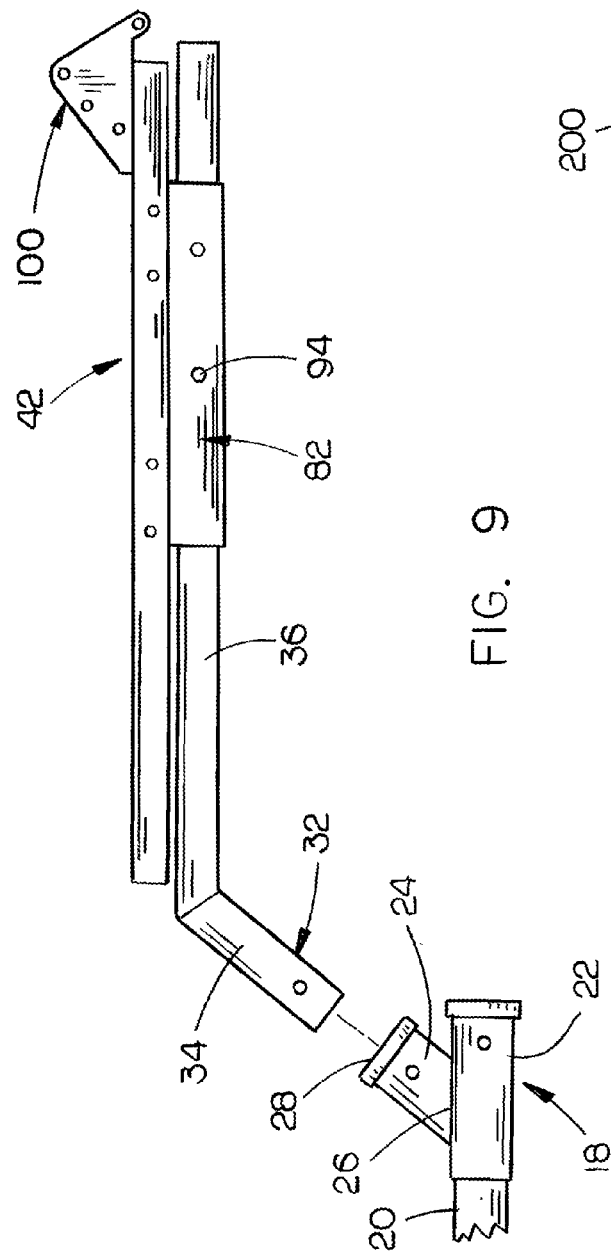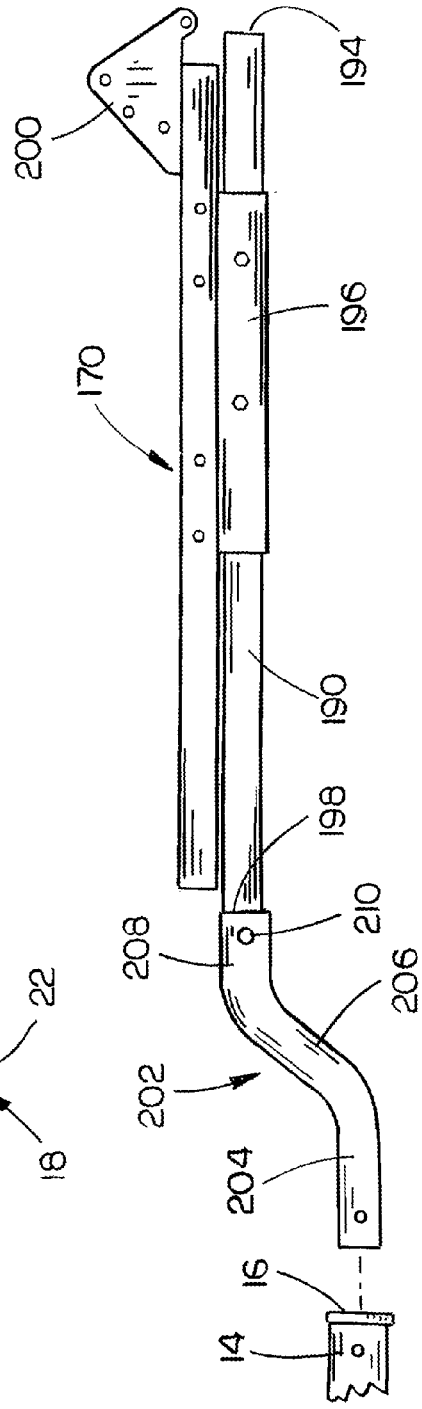
FIG. 9
FIG. 8

PORTABLE ICE FISHING AND CAMPING SHELTER

BACKGROUND OF THE INVENTION

1. Field of the Invention

This invention relates to a portable ice fishing and camping shelter and more particularly to a portable ice fishing and camping shelter which is mounted on the rear or front of a vehicle such as an ATV, UTV, SUV or truck.

2. Description of the Related Art

Many different types of portable shelters have been previously provided for use in ice fishing. Many of those prior art devices are mounted on a sled so that the shelter may be moved from one location to another on a frozen body of water. The sled mounted shelters are usually quite heavy and are difficult to transport to a lake since they must usually be loaded onto the bed of a truck or the like.

Portable shelters have also been provided which are attached to a hitch receiver mounted on the rear of a vehicle such as an ATV, UTV, SUV or truck. However, those shelters are difficult to attach to the hitch receiver. Further, when the prior art hitch mounted shelters are in their collapsed transport position, the shelters block the tail lights and license plate of the vehicle. Further, in those hitch mounted shelters, the clearance between the lower end of the collapsed shelter and the ground is minimal. Thus, the collapsed shelter, when being transported over the road or over the like, may be damaged.

Another disadvantage of the prior art hitch receiver mounted shelters is that when the fisherman or fishermen sit on the seats thereof, the suspension of the vehicle is compressed which results in the seats being lowered to an uncomfortable height.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The portable ice fishing and camping shelter of this invention may be mounted on the rear or front of a vehicle such as an ATV, UTV, SUV or truck. For purposes of conciseness, the invention will be described as being mounted on the rear of a vehicle having a rearwardly extending first hitch receiver. In a first embodiment of the invention, Applicant's patented dual hitch receivers with a drawbar (hereinafter dual hitch receivers) are utilized as part of the invention. The drawbar of the patented dual hitch receivers is inserted into the rearward end of the first hitch receiver mounted on the rearward end of the vehicle. The dual hitch receiver of Applicant's U.S. Design Pat. No. D709,805 S includes a lower horizontally disposed second hitch receiver and an upwardly and rearwardly disposed third hitch receiver with the third hitch receiver having a lower forward end and an open upper rearward end. A second drawbar is provided which includes first and second drawbar portions. The first drawbar portion of the second drawbar is secured to the third hitch receiver and extends upwardly and rearwardly therefrom. The second drawbar portion of the second drawbar extends horizontally rearwardly from the upper rearward end of the first drawbar portion of the second drawbar.

The shelter of the first embodiment of the invention includes a horizontally disposed base frame which includes a transversely extending and horizontally disposed forward end frame member having first and second ends. A first side frame member extends horizontally rearwardly from the first end of the forward end frame member. A second side frame member extends horizontally rearwardly from the second end of the forward end frame. A pair of cross-frame members are secured to the first and second side frame members and extends therebetween in a horizontally spaced-apart relationship. A pair of seat members are secured to the first and second cross-frame members. A longitudinally extending receiver is secured to the underside of the cross-frame members. The base frame is secured to the second drawbar portion of the second drawbar by moving the base frame forwardly so that the receiver on the underside of the cross-frame members receives the second drawbar portion of the second drawbar.

A first hinge plate is secured to the first side frame member at the rearward end thereof and a second hinge plate is secured to the second frame member at the rearward end thereof. A collapsible shelter frame assembly is pivotally secured to the first and second hinge plates. The collapsible shelter frame assembly may be selectively pivotally moved between a collapsed position and a shelter position over the seat members and rearwardly thereof. The collapsible shelter frame assembly is configured to have a flexible cover mounted thereon.

In the second embodiment of the invention, the horizontally disposed forward end of an S-shaped drawbar is secured to the rearwardly extending first hitch receiver of the vehicle. The shelter of the second embodiment of the invention includes a horizontally disposed base frame which includes a transversely extending and horizontally disposed forward end frame member having first and second ends. A first side frame member extends horizontally rearwardly from the first end of the forward end frame member. A second side frame member extends horizontally rearwardly from the second end of the forward end frame. A pair of cross-frame members are secured to the first and second side frame members and extends therebetween in a horizontally spaced-apart relationship. A pair of seat members are secured to the first and second cross-frame members. A longitudinally extending center support post is secured to the underside of the cross-frame members and is secured thereto. The base frame is secured to the upper rearward end of the S-shaped drawbar by moving the base frame forwardly so that the forward end of the center support post is received by the rearward end of the S-shaped drawbar.

A first hinge plate is secured to the first side frame member at the rearward end thereof and a second hinge plate is secured to the second frame member at the rearward end thereof. A collapsible shelter frame assembly is pivotally secured to the first and second hinge plates. The shelter frame assembly is selectively pivotally moved between a collapsed position and a shelter position. The shelter frame assembly is configured to have a flexible cover mounted thereon.

A principal object of the invention is to provide an improved portable ice fishing and camping shelter.

A further object of the invention is to provide a portable ice fishing and camping shelter which is selectively movable between collapsed and shelter positions.

A further object of the invention is to provide a portable ice fishing and camping shelter which may be selectively removably secured to the either the front or rear end of a vehicle.

A further object of the invention is to provide a portable ice fishing and camping shelter which when in its collapsed position for transport, has sufficient clearance between the base frame of the shelter and the ground or ice.

A further object of the invention is to provide a portable ice fishing and camping shelter which, when in its collapsed position for transport, does not interfere with or shield the tail lights of the vehicle.

A further object of the invention is to provide a portable ice fishing and camping shelter which is easily attached to a vehicle mounted hitch receiver.

A further object of the invention is to provide a portable ice fishing and camping shelter which may be used with Applicant's patented dual receivers and drawbar.

A further object of the invention is to provide a portable ice fishing shelter which includes a foot rest for the fisherman so that the feet of the fisherman are elevated above the ice.

A further object of the invention is to provide a portable ice fishing shelter which is stabilized against movement with respect to the ice.

Yet another object of the invention is to provide a portable ice fishing shelter including means for supporting various objects such as an ice auger, minnow buckets, fishing rods or a pop-up tent above the collapsed shelter for transport purposes.

Still another object of the invention is to provide a portable shelter which is stable in high winds.

Still another object of the invention is to provide a portable shelter which prevents wind from entering the interior of the shelter.

Still another object of the invention is to provide a portable shelter which is easily and securely transportable to a lake and to a fishing hole thereon.

Still another object of the invention is to provide a means for elevating the shelter thereof above the ground or ice for transport purposes.

Still another object of the invention is to provide a shelter which is easily transported from one location to another and which is easily converted from a collapsed transport position to an extended shelter position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 8 is a side view which illustrates the manner in which the base frame of FIG. 7 is attached to the receiver hitch of a vehicle;

FIG. 9 is a side view which illustrates the manner in which the base frame of FIG. 1 is attached to Applicant's patented dual receiver and drawbar which may be secured to a receiver hitch of a vehicle;

DESCRIPTION OF THE PREFERRED EMBODIMENT

Figure 1:
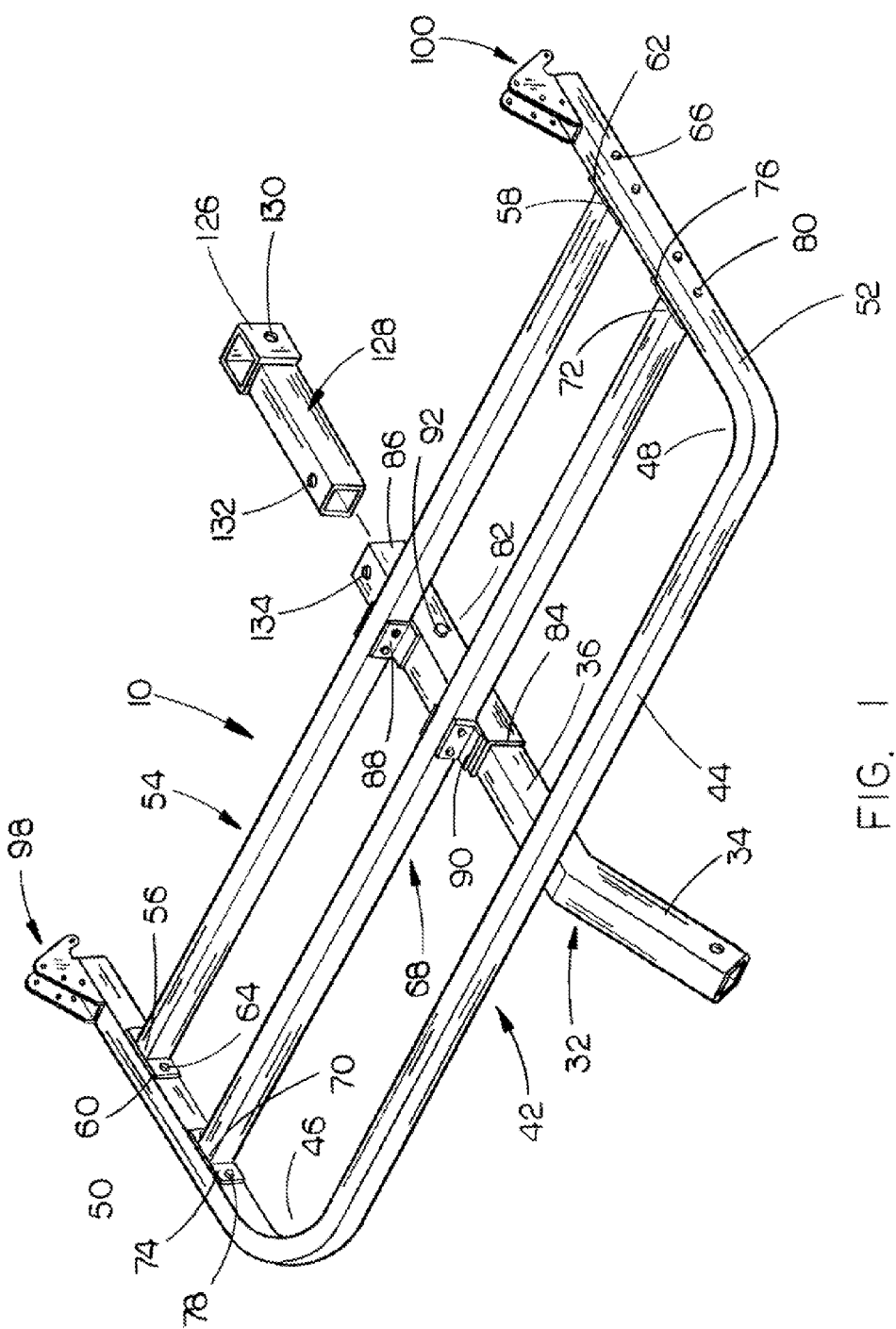
FIG. 1 is an exploded perspective view of the first embodiment of the base frame of the invention with a selectively removable support member at its rearward end.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The first embodiment of the portable ice fishing and camping shelter of this invention is referred to generally by the reference numeral 10. Shelter 10 is designed so as to be attached to either the rear of a vehicle or the front of a vehicle 12. For purposes of conciseness, the shelter 10 will be described as being attached to the rear of a vehicle 12 such as an ATV, UTV, SUV or truck.

Vehicle 12 has a rearwardly extending first hitch receiver 14 mounted at the rearward end thereof. Receiver 14 has an open rearward end 16. The numeral 18 refers to Applicant's patented dual receivers and drawbar which is shown and described in U.S. Design Pat. No. D709,805S. Dual receiver 18 includes a drawbar 20 having a horizontally disposed lower hitch receiver 22 and an upper hitch receiver 24 which extends upwardly and rearwardly from drawbar 20. Hitch receiver 24 will be described as having a lower forward end 26 and an open upper rearward end 28. The forward end of drawbar 20 is received in and secured to the rearward end of hitch receiver 14 by a pin 30 in conventional fashion.

The numeral 32 refers to a second drawbar having a first drawbar portion 34 and a second drawbar portion 36. The first drawbar portion 34 of drawbar 32 is received in the upper rearward end 28 of upper hitch receiver 24 and is secured therein by a pin 38. As seen, drawbar portion 34 extends upwardly and rearwardly from upper hitch receiver 24. The second drawbar portion 36 of drawbar 32 extends horizontally rearwardly from the upper end of drawbar portion 34. The rearward end of drawbar portion 34 has one or more horizontally extending pin openings 40 formed therein.

Figure 2:
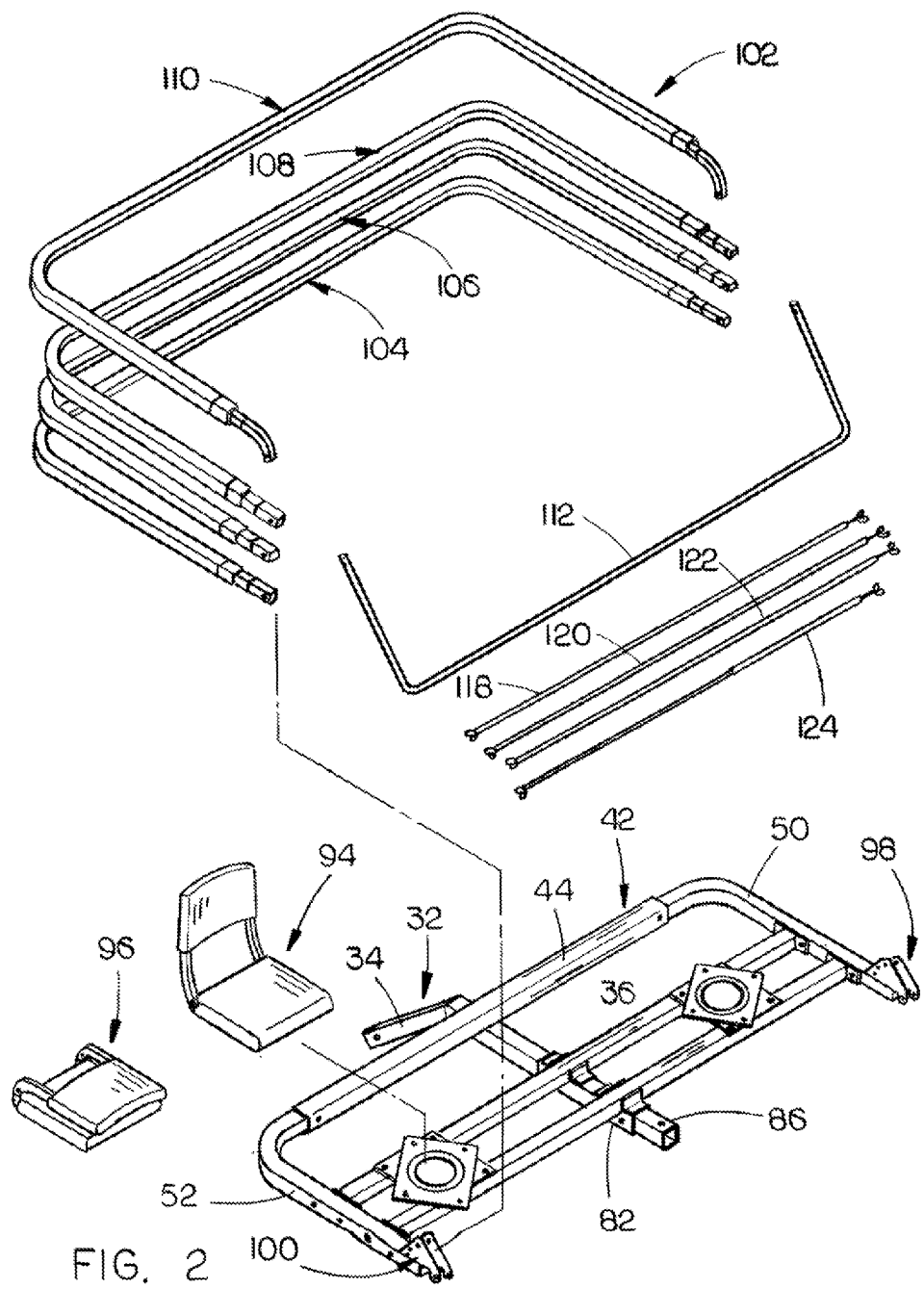
FIG. 2 is an exploded perspective view of the components of the shelter of this invention, less the shelter cover, with the first embodiment of the base frame slightly modified.
Figure 7:
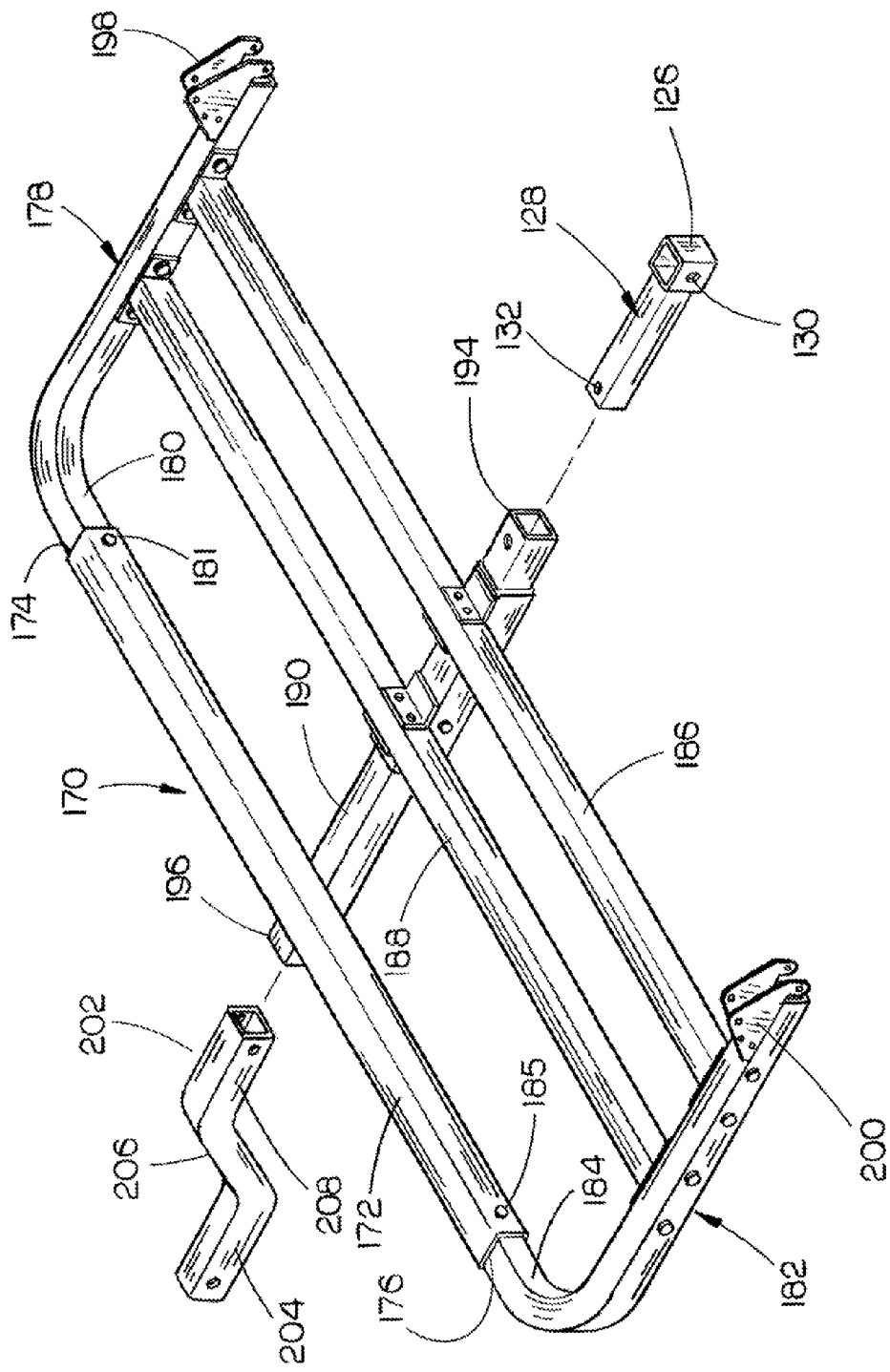
FIG. 7 is a perspective view of a second embodiment of the base frame of the invention.
Figure 10:
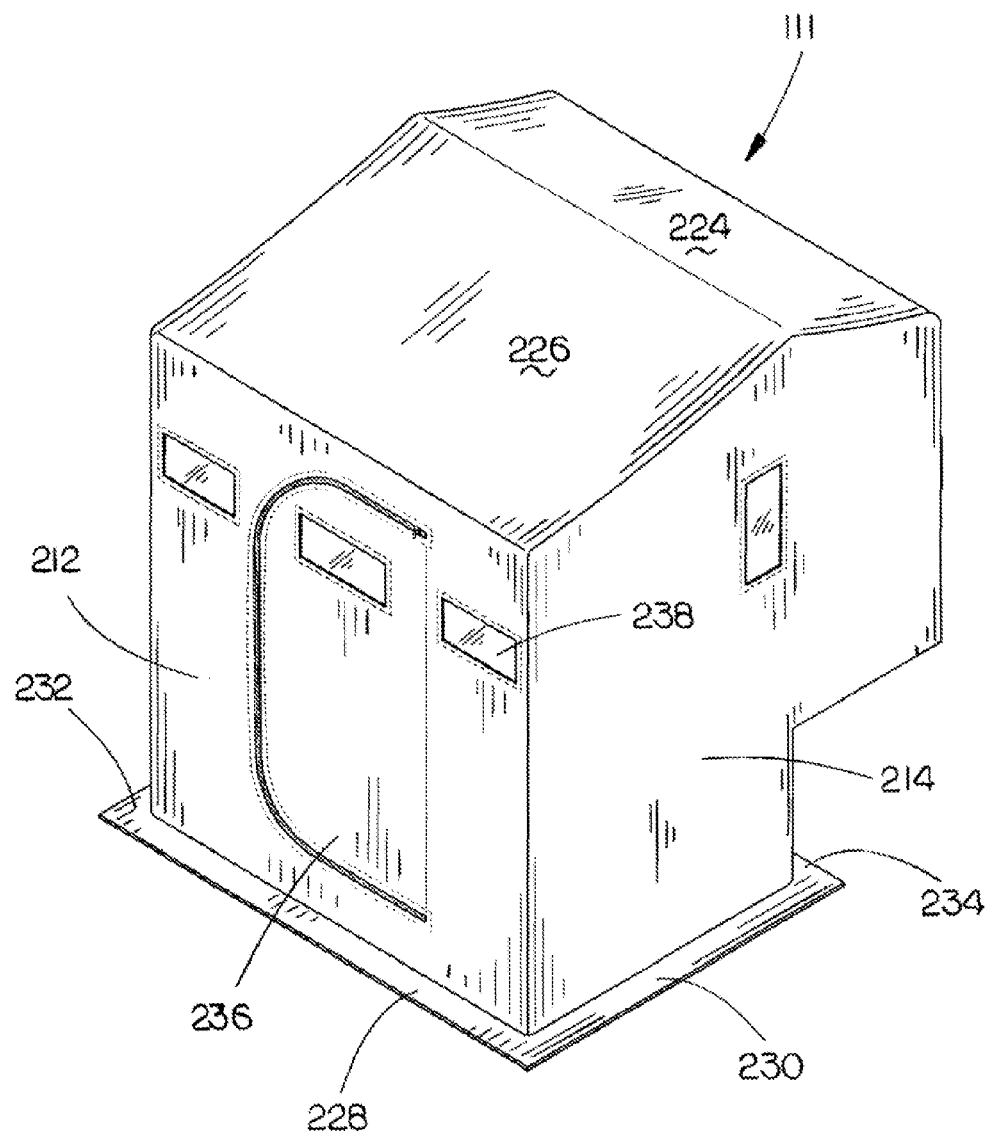
FIG. 10 is a rear perspective view of the shelter of this invention.
Figure 11:
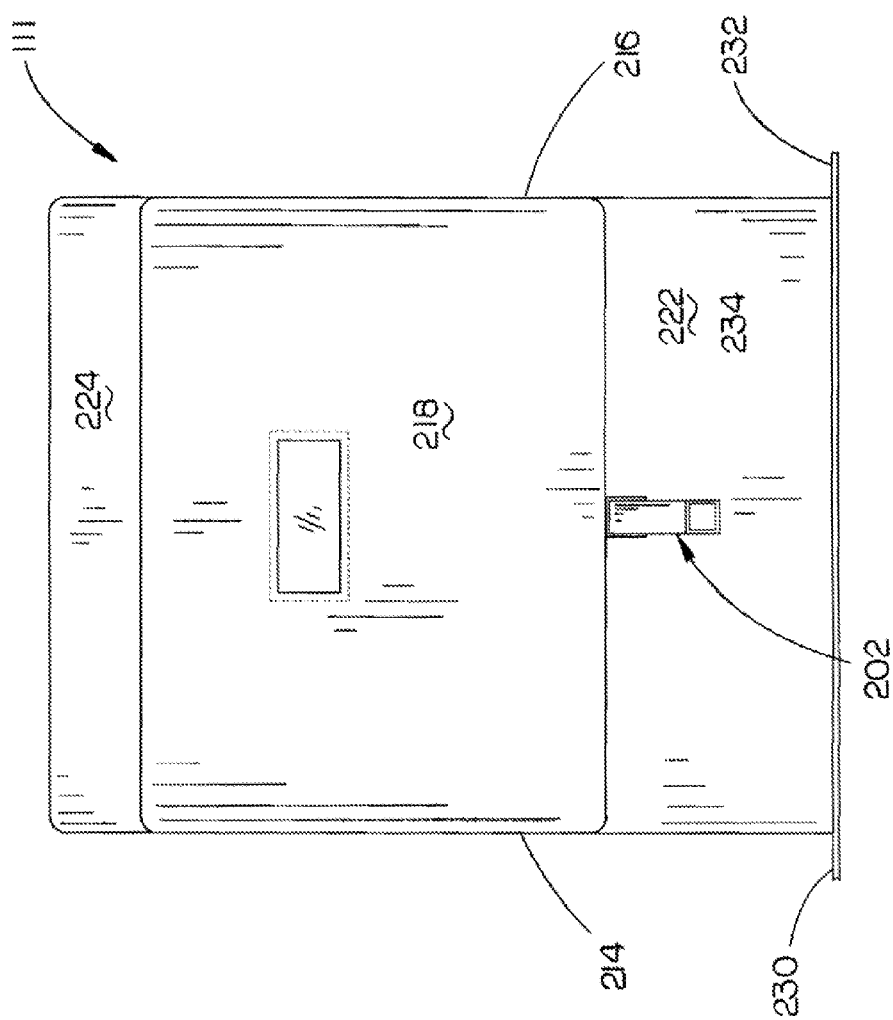
FIG. 11 is a front view of the shelter of this invention.
Figure 12:
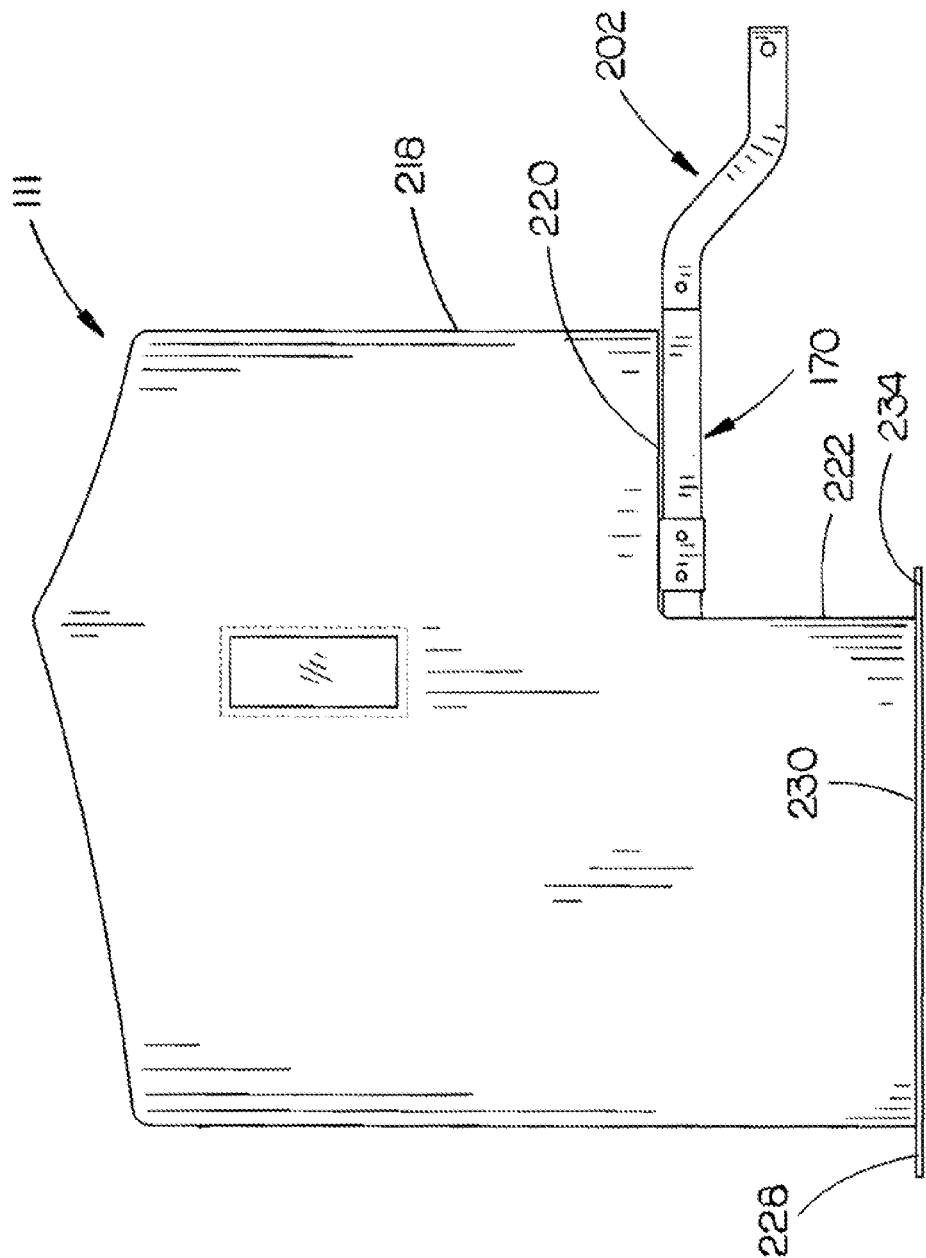
FIG. 12 is a side view of the shelter of this invention wherein the base frame thereof is the second embodiment.

Shelter 10 includes a horizontally extending base or main frame 42. Frame 42 preferably has the configuration seen in FIGS. 1 and 2 of the drawings but could have other shapes or configurations if so desired. Base frame 42 will be described as having a transversely extending and horizontally disposed front or forward frame member 44 having a first end 46 and a second end 48. Frame member 44 may be of one-piece construction or be comprised of telescopic sections, as seen in FIG. 7. A first side frame member 50 extends rearwardly from end 46 of frame member 44. A second side frame member 52 extends rearwardly from end 48 of frame member 44. Each of frame members 44, 50 and 52 may be of one-piece construction or be comprised of telescopic members to enable the length of frame members 44, 50 and 52 to be shortened for shipping or storage. The numeral 54 refers to a cross-frame member having ends 56 and 58. End 56 of cross-frame member 54 has a mounting plate 60 secured thereto by welding. End 58 of cross-frame member 54 has a mounting plate 62 secured thereto by welding. Plate 60 is secured to side frame member 50 by bolts 64 and plate 62 is secured to side frame member 52 by bolts 66. As seen, cross-frame member 54 is spaced rearwardly from frame member 44. Cross-frame member 54 may be of one-piece construction or have two telescopic members to enable cross-frame member 54 to be shortened for shipping or storage. Preferably, a second cross-frame member 68 having ends 70 and 72 is utilized. Further, more than two cross-frame members could be utilized if desired. End 70 of cross-frame member 68 has a mounting plate 74 secured thereto by welding. End 72 of cross-frame member 68 has a mounting plate 76 secured thereto by welding. Plate 74 is secured to side frame member 50 by bolts 78 and plate 76 is secured to side frame member 52 by bolts 80. Cross-frame member 68 may be of one-piece construction or be comprised of telescopic members to enable cross-frame member 68 to be shortened for shipping or storage. As seen, cross-frame member 68 is spaced forwardly of the rearward ends of side frame members 50 and 52 and is spaced forwardly with respect to cross-frame member 54.

In the first embodiment, the numeral 82 refers to a center support post 82 having a forward end 84 and a rearward end 86. Receiver 82 is positioned below the cross-members 54 and 68 at the center lengths thereof and is secured to cross-frame members 54 and 68 by welding or mounting plates 88 and 90 which are welded to receiver 82 and bolted to cross-frame members 54 and 68 respectively. Receiver 82 has one or more pin openings 92 formed therein.

The frame 42 is easily attached to the second drawbar portion 36 of drawbar 32 by moving the frame 42 forwardly with respect to drawbar portion 36 so that the forward end of receiver 82 slidably receives drawbar portion 36. The receiver 82 is secured to drawbar portion 36 by a pin 94 extending through one of the pin openings 92 in receiver 82 and through one of the pin openings 40 in drawbar portion 36. Rearwardly facing and foldable seats 94 and 96 are secured to cross-frame members 54 and 68 by any convenient means. When the shelter is used as a camping shelter, the seats 94 and 96 will be replaced with a sitting or sleeping cushion.

The rearward ends of side frame members 50 and 52 have hinge plate assemblies 98 and 100 secured thereto respectively. The numeral 102 refers to a collapsible shelter frame assembly which is secured to the hinge plates 98 and 100 and which is selectively movable between collapsed and shelter positions.

Figure 3:
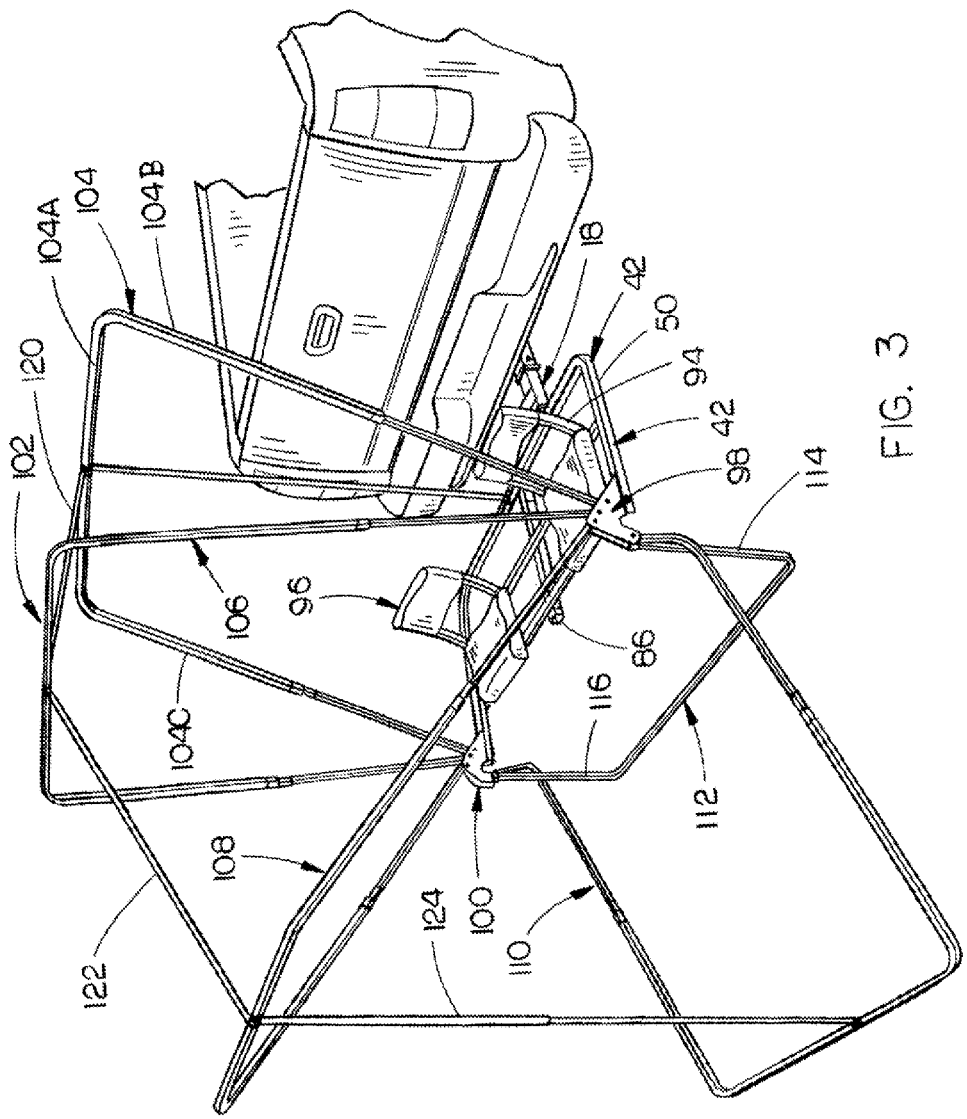
FIG. 3 is a rear perspective view of the components of the shelter, less the shelter cover, in a shelter position and wherein the base frame of FIG. 1 is illustrated.
Figure 4:
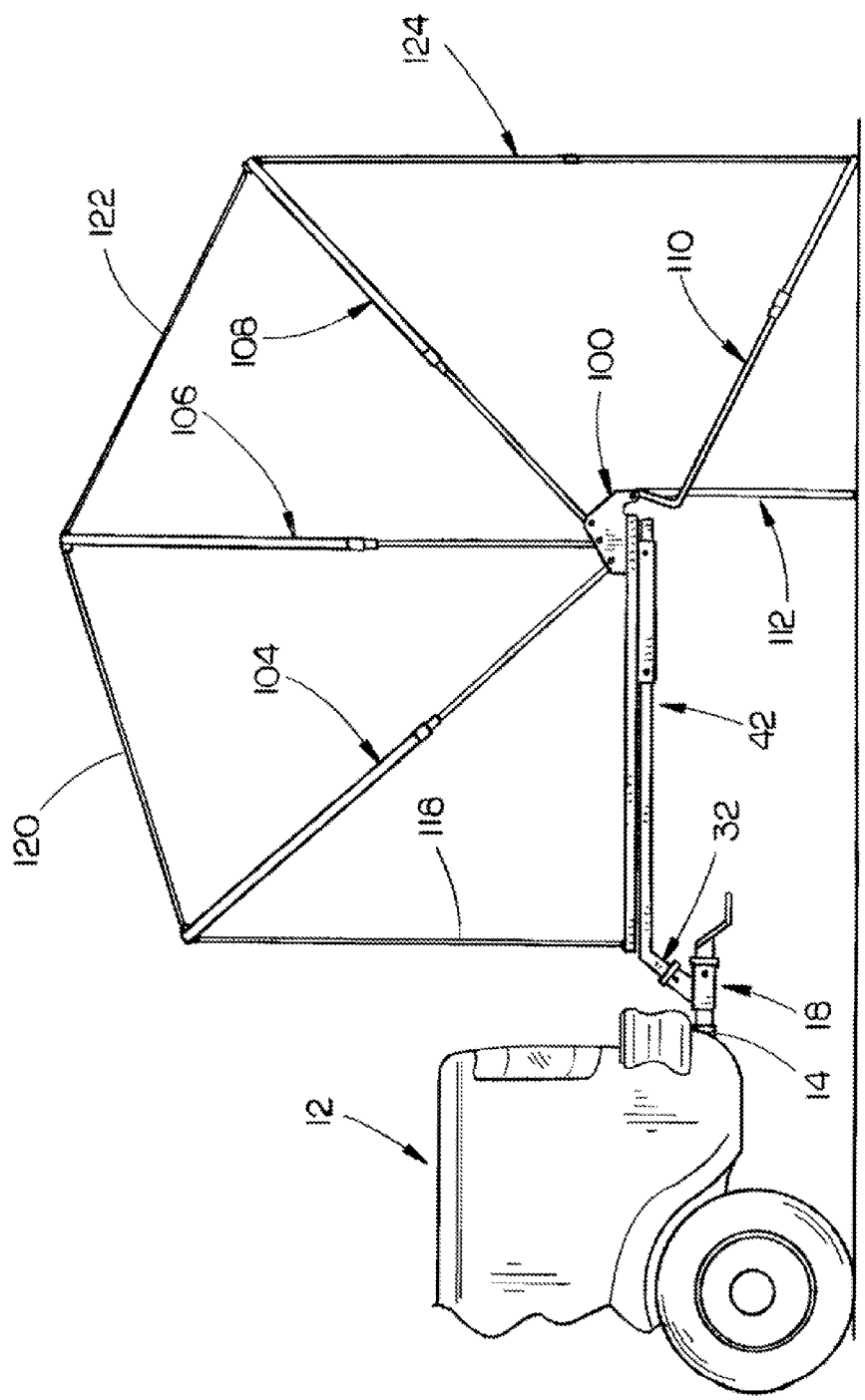
FIG. 4 is a side view of the components of the shelter, less the shelter cover, in a shelter position and whereas the base frame of FIG. 1 is illustrated.
Figure 5:
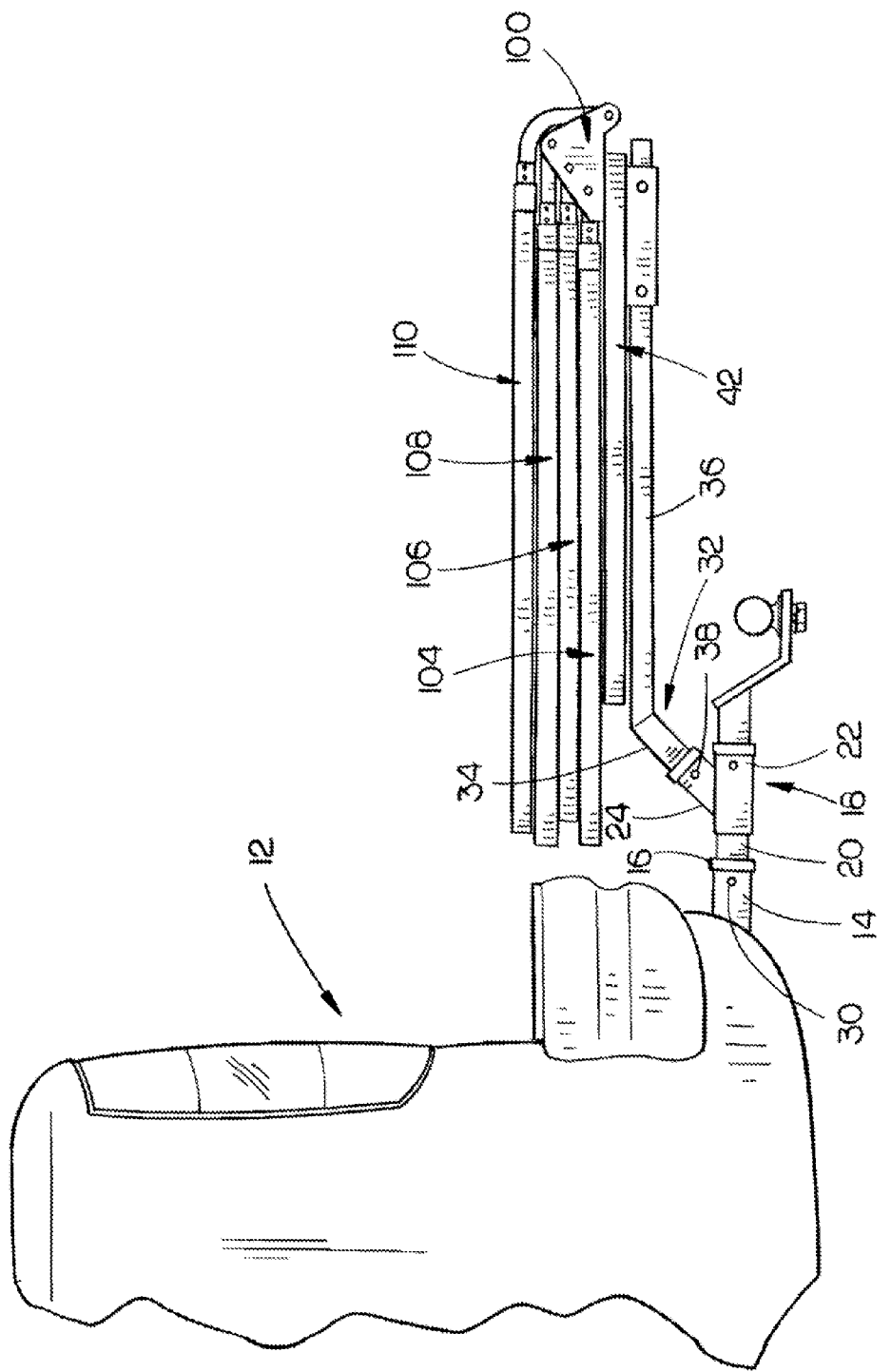
FIG. 5 is a side view of the shelter of FIG. 4 in a collapsed transport position.

The numerals 104, 106, 108 and 110 refer to generally inverted U-shaped bows. Inasmuch as each of the bows 104, 106, 108 and 110 are substantially identical, only bow 104 will be described in detail. Bow 104 includes a base leg 104A and side legs 104B and 104C. The side legs 104B and 104C are preferably length adjustable to facilitate the transport of the collapsed shelter frame assembly 102. The free ends of side legs 104B and 104C are pivotally secured to hinge plate assemblies 98 and 100 respectively. The free ends of side legs 104, 106, 108 and 110 are also pivotally secured to hinge plate assemblies 98 and 100. The bows 104, 106, 108 and 110 are selectively pivotally movable between a collapsed position wherein they are positioned over base frame 42 to a shelter position, as seen in FIG. 3. When the bows 104, 106, 108 and 110 are in their collapsed position, they do not block or shield the tail lights of the vehicle. The bows 104, 106, 108 and 110 are configured to support a flexible fabric cover 111 thereon which will be described in more detail hereinafter. The side legs of the bows 104, 106, 108 and 110 are telescopic so that they may be extended to the position of FIG. 3 or to the collapsed position of FIG. 5. The numeral 112 refers to a generally U-shaped bow which has its side legs 114 and 116 pivotally secured to hinge plates 98 and 100 respectively so as to be selectively movable between the operative or shelter position of FIG. 3 to the collapsed position of FIG. 5.

The numerals 118, 120, 122 and 124 refer to optional spreader bars. When the collapsible shelter frame assembly is in its shelter position of FIG. 3, spreader bar 118 may be positioned between base leg 104A and frame member 44 and spreader bar 120 may be extended between the base legs of bows 104 and 106. Spreader bar 122 may also extend between the base legs of bows 106 and 108 as seen in FIG. 3. Spreader bar 124 is length adjustable and may be extended between the base legs of bows 108 and 110 as seen in FIG. 3. The spreader bars may or may not be used, but when used they maintain the cover 111 which encloses the shelter in a tight position on the bows.

When the shelter is in its shelter position, the cover 111 extends over the person or persons sitting on the seats as well as the area rearwardly of the seats so as to extend over the ice fishing hole. The shelter of this invention may also be used for camping. When the shelter is used as a camping shelter, a flexible floor will be zippered in.

When the shelter is in its collapsed position, the base frame 42 is positioned a sufficient distance above the ground or ice so that the shelter will not be damaged in transit. The height of the frame is achieved through the use of the upper receiver 24, the drawbar 32 and the receiver 82 which is positioned beneath the frame 42.

An optional vertically disposed square or rectangular collar 126 is secured to the rearward end of a square or rectangular tube 128. Collar 126 has a set screw or pin opening 136 while tube 128 has a set screw or pin opening 132 formed therein. The forward end of tube 128 is selectively removably received in the rearward end 86 of receiver 82. Tube 128 is maintained in receiver 82 by a pin or bolt extending through pin opening 134 in receiver 82 and the pin opening 132 in tube 128.

Collar 126 serves many purposes. Collar 126 is configured to have a foot rest assembly 136 secured thereto as will now be described. Foot rest assembly 136 includes a horizontally disposed and elongated frame member 138 with ends 140 and 142. The forward side of frame member 38 has a vertically disposed collar 144 secured thereto by welding or the like. A vertically disposed support post 146 is selectively vertically movably received by collar 144 by means of a pin 148 extending through an opening in collar 144 and into one of the vertically spaced-apart openings 150 in post 146. The upper end of post 146 is selectively vertically received by collar 126 by means of a pin extending through one of the openings 150 in post 146 and into collar 126.

The frame member 138, which forms a foot rest for the fishermen, may have stabilizing legs 152 and 154 secured to the ends 140 and 142 respectively. The lower ends of legs 152 and 154 have ice or ground engaging pads 156 and 158 secured thereto. The numeral 159 refers to a table which includes a support post 160 which may be inserted into the upper end of post 146. Table 159 is selectively vertically adjustable.

Figure 6:
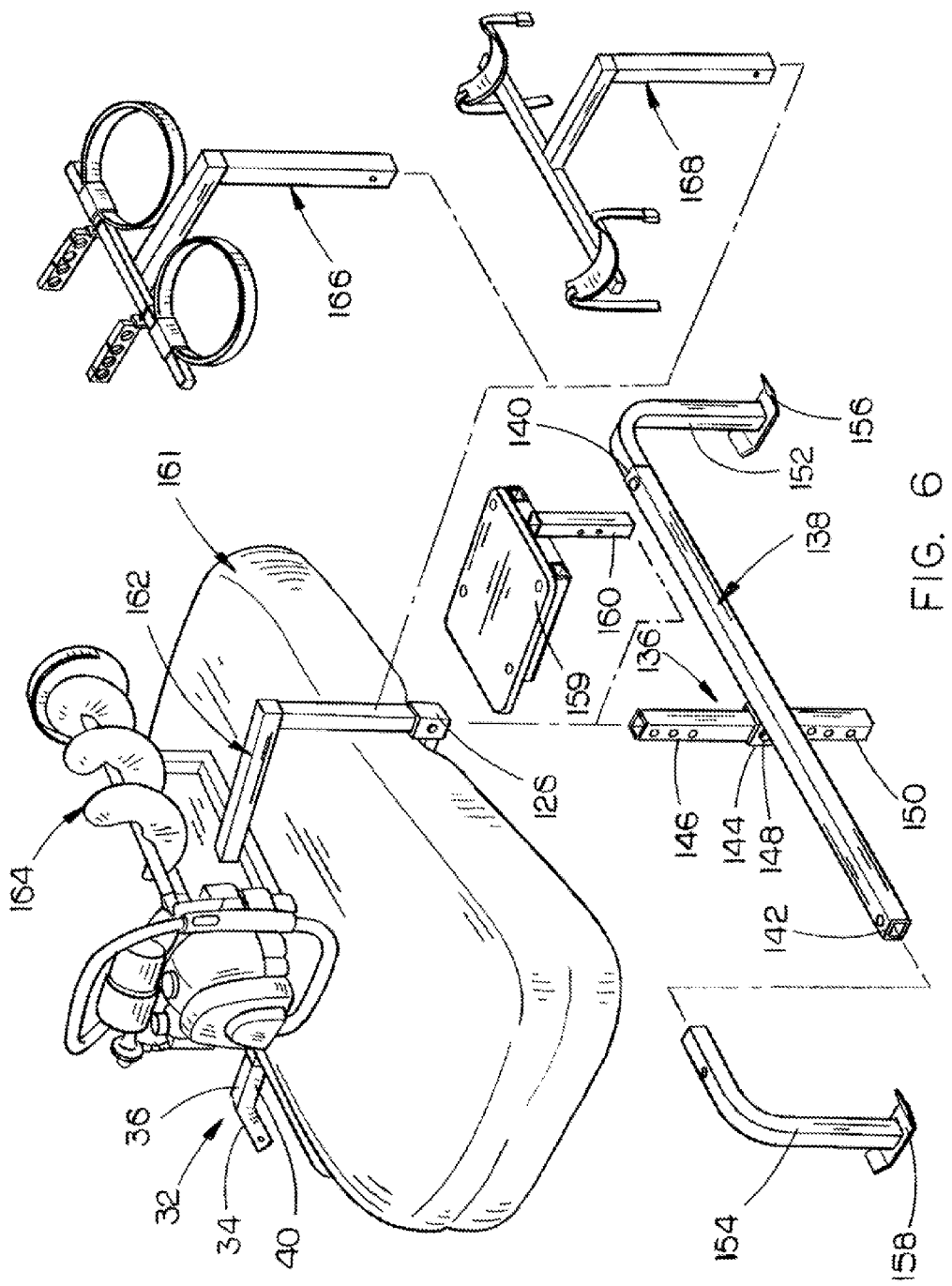
FIG. 6 is a perspective view illustrating various components which may be attached to the base frame of FIG. 1 when the shelter is in its collapsed transport position.

The foot rest assembly 136 will be removed from collar 126 when the shelter is collapsed for transport purposes. In that case, the collapsed bows and cover will usually be covered with a canvas cover 161, as seen in FIG. 6. The numeral 162 refers to a support which may be secured to the collar 126 for supporting an ice auger 164 thereon for transport purposes. A support 166 may also be secured to collar 126 for transporting minnow buckets and fishing rods thereon. Further, a support 168 may be secured to the collar 126 for supporting a pop-up tent or the like thereon.

The numeral 170 refers to a modified form of the base frame which differs somewhat from the base frame 42 and the structure which secures the base frame 170 to the vehicle. Base frame 170 includes a horizontally disposed forward end frame member 172 having ends 174 and 176. A side frame member 178 extends laterally and rearwardly from end 174 of frame member 172 and has a rearward end 180 which is secured to end 174 by pin 181. A side frame member 182 extends laterally and rearwardly from end 176 of frame member 172 and has a rearward end 184 which is secured to end 176 of frame member 172 by pin 185. A pair of cross-frame members 186 and 188 have their ends secured to side frame members 178 and 182 in the same manner as the cross-frame members 54 and 68 are secured to frame members 50 and 52 of base frame 42 described hereinabove. The ends of cross-frame members 186 and 188 could be welded to side frame members 178 and 182.

The numeral 190 refers to an elongated center support having a rearward end 192 and a forward end 194. Center support 190 is positioned below frame members 172, 186 and 188. Center support 190 is secured cross-frame members 186 and 188 by any convenient means or by bracket 196. Center support 190 will be described as having ends 194 and 196. Hinge plate assemblies 198 and 200, which are identical to hinge plate assemblies 98 and 100, are secured to the rearward ends of side frame members 178 and 182 respectively.

The numeral 202 refers to an S-shaped and tubular drawbar which includes a horizontally disposed forward end portion 204, an upwardly and rearwardly extending intermediate portion 206, and a horizontally disposed rearward end portion 208. Forward end portion 208 of drawbar 202 is secured to the forward end 194 of center support 190 and secured thereto in conventional fashion by a pin 210 (FIG. 8). The rearward end 194 of center support 190 is adapted to receive the forward end of the tube 128 which has been previously described and which serves the same purposes as described above.

The base leg of bow 104 is secured to the interior of cover 111 as the intersection of the upper front wall portion 218 and the front roof wall portion 224 by hook and loop fastener strips. The base leg of bow 106 is similarly secured to the interior of the cover 111 at the intersection of front roof portion 224 and rear roof portion 226. The base leg of bow 108 is similarly secured to the interior of the cover 111 at the intersection of the upper end of rear wall 212 and the rear end of rear roof portion 226. The base leg of bow 110 is similarly secured to the interior of cover 111 at the lower end of rear wall 212. The bottom wall portion 220 of cover 111 will be positioned at the underside of the base frame. The lower front wall portion 222 will be positioned at the forward side of bow 116 which will be vertically disposed, as seen in FIG. 3. The spreader bars 118, 120, 122 and 124 are preferably employed to maintain the cover 111 in a tight position.

The cover 111 will be described as having a rear wall 212, a first side wall 214, a second side wall 216, an upper front wall portion 218, a bottom wall portion 220 which extends horizontally rearwardly from the lower end of front wall portion, a lower front wall portion 222 which extends vertically downwardly from the rearward end of bottom wall portion 220, a front roof portion 224 and a rear roof portion 226.

Preferably, the lower ends of rear wall 212, first side wall 214, second side wall 216 and lower front wall portion 222 have flaps 228, 230, 232 and 234 extending outwardly therefrom to aid in sealing the interior of the cover 111. Rear wall 212 has a door 236 formed therein and one or more windows 238 formed therein. Preferably, the side walls will also have one or more windows formed therein.

The fact that the base frame and the seats thereon are elevated above the hitch receiver of the vehicle in both of the embodiments herein prevents the seats to be lowered to an uncomfortable height by the weight of the persons sitting on the seats which compresses the suspension system of the vehicle.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A portable shelter for use with a vehicle, with forward and rearward ends, having a horizontally disposed first tubular hitch receiver which extends rearwardly from the rearward end of the vehicle, comprising:

a horizontally disposed first drawbar having a forward end and a rearward end;

said forward end of said first drawbar being received in said rearward end of the first tubular hitch receiver;

an angularly disposed second tubular hitch receiver having a lower forward end and an upper rearward end;

said lower forward end of said second tubular hitch receiver being secured to said first draw bar;

said second tubular hitch receiver extending upwardly and rearwardly from said first drawbar;

an angular second drawbar having first and second drawbar portions;

said first drawbar portion of said second drawbar having a lower forward end and an upper rearward end;

said lower forward end of said first drawbar portion of said second drawbar being received by and secured to said upper rearward end of said second tubular hitch receiver;

said first drawbar portion of said second drawbar extending upwardly and rearwardly from said second tubular hitch receiver;

said second drawbar portion of said second drawbar having forward and rearward ends and extending rearwardly from said upper rearward end of said first drawbar portion of said second drawbar;

a horizontally disposed support frame having a forward end, a rearward end, a first side, a second side, an upper side and a lower side;

a horizontally disposed support member having a forward end and a rearward end;

said support member being secured to said support frame at said lower side of said support frame;

said forward end of said support member being secured to said rearward end of said second drawbar portion of said second drawbar;

at least one seat member positioned on said support frame and secured thereto;

a first hinge plate secured to said support frame adjacent said rearward end of said support frame at said first side thereof;

a second hinge plate secured to said support frame adjacent said rearward end of said support frame at said second side thereof;

a collapsible shelter frame assembly pivotally secured to said first and second hinge plates;

said collapsible shelter frame assembly being selectively movable between a horizontally disposed collapsed position and a shelter position over said support frame and rearwardly thereof; and a flexible cover mounted on said collapsible shelter frame assembly.

2. The portable shelter of claim 1 wherein said support frame includes:
  a. an elongated forward end frame member having first and second ends;
  b. a first side frame member having first and second ends;
  c. a second side frame member having first and second ends;
  d. said first end of said forward end frame member being secured to said first side frame member at said first end thereof;
  e. said second end of said forward end frame member being secured to second side frame member at said first end thereof;
  f. at least one elongated cross-frame member having first and second ends with said first end thereof being secured to said first side frame member and with said second end thereof being secured to said second side frame member;
  g. said cross-frame member having said support member secured thereto.

3. The portable shelter of claim 1 wherein said first drawbar has a horizontally and rearwardly extending third tubular hitch receiver which is positioned below said second tubular hitch receiver and wherein a ball hitch is secured to said third tubular hitch receiver.

4. The portable shelter of claim 1 wherein a collar is secured to said rearward end of said support member which has a vertical opening formed therein and wherein a horizontally disposed foot rest is selectively removably secured to said collar with said foot rest being positioned below said at least one seat member.

5. The portable shelter of claim 4 wherein said foot rest has first and second ends and wherein a stabilizer member is secured to each of said first and second ends of said foot rest.

6. The portable shelter of claim 4 wherein said foot rest is selectively vertically adjustably secured to said collar.

7. The portable shelter of claim 1 wherein a collar is secured to said rearward end of said support member which has a vertical opening formed therein and wherein a cargo support structure is selectively removably secured to said collar for supporting cargo above the collapsed shelter frame assembly above said support frame.

8. The portable shelter of claim 7 wherein the cargo support structure is configured to support an ice auger thereon.

9. The portable shelter of claim 7 wherein the cargo support structure is configured to support minnow buckets and fishing rods.

10. The portable shelter of claim 7 wherein the cargo support structure is configured to support a pop-up tent.

11. The portable shelter of claim 1 wherein a collar is secured to said rearward end of said support member which has a vertical opening formed therein and wherein a table is selectively removably secured to said collar.

12. A portable shelter for use with a vehicle, with forward and rearward ends, having a horizontally disposed first tubular hitch receiver which extends forwardly, from the forward end of the vehicle, comprising, a horizontally disposed first drawbar having a forward end and a rearward end;

said rearward end of said first drawbar being received in said forward end of the first tubular hitch receiver;

an angularly disposed second tubular hitch receiver having a lower rearward end and an upper forward end;

said lower rearward end of said second tubular hitch receiver being secured to said first draw bar;

said second tubular hitch receiver extending upwardly and forwardly from said first drawbar;

an angular second drawbar having first and second drawbar portions;

said first drawbar portion of said second drawbar having a lower rearward end and an upper forward end;

said lower rearward end of said first drawbar portion of said second drawbar being received by and secured to said upper forward end of said second tubular hitch receiver;

said first drawbar portion of said second drawbar extending upwardly and forwardly from said second tubular hitch receiver;

said second drawbar portion of said second drawbar having forward and rearward ends and extending forwardly from said upper forward end of said first drawbar portion of said second drawbar;

a horizontally disposed support frame having a forward end, a rearward end, a first side, a second side, an upper side and a lower side;

a horizontally disposed support member having a forward end and a rearward end;

said support member being secured to said support frame at said lower side of said support frame;

said rearward end of said support member receiving said forward end of said second drawbar portion of said second drawbar;

at least one seat member being positioned on said support frame and secured thereto;

a first hinge plate secured to said support frame adjacent said forward end of said support frame at said first side thereof;

a second hinge plate secured to said support frame adjacent said forward end of said support frame at said second side thereof;

a collapsible shelter frame assembly pivotally secured to said first and second hinge plates;

said collapsible shelter frame assembly being selectively movable between a horizontally disposed collapsed position and a shelter position over said support frame and forwardly thereof; and a flexible cover mounted thereon on said collapsible shelter frame assembly.

13. The portable shelter of claim 12 wherein said support frame includes:
  a. an elongated rearward end frame member having first and second ends;
  b. a first side frame member having first and second ends;
  c. a second side frame member having first and second ends;
  d. said first end of said rearward end frame member being secured to end of said first side frame member at said first end thereof;
  e. said second end of said rearward end frame member being secured to said second side frame member at said first end thereof;
  f. at least one elongated cross-frame member having first and second ends with said first end thereof being secured to said first side frame member and with said second end thereof being secured to said second side frame member;

g. said cross-frame member having said support member secured thereto.

14. The portable shelter of claim 13 wherein a collar is secured to said forward end of said support member which has a vertical opening formed therein and wherein a cargo support structure is selectively removably secured to said collar for supporting cargo above the collapsed shelter frame assembly above said support frame.

15. The portable shelter of claim 12 wherein said first drawbar has a horizontally and forwardly extending third tubular hitch receiver which is positioned below said second tubular hitch receiver and wherein a ball hitch is secured to said third tubular hitch receiver.

16. The portable shelter of claim 12 wherein a collar is secured to said forward end of said support member which has a vertical opening formed therein and wherein a horizontally disposed foot rest is selectively removably secured to said collar with said foot rest being positioned below said at least one seat member.

17. The portable shelter of claim 16 wherein said foot rest has first and second ends and wherein a stabilizer member is secured to each of said first and second ends of said foot rest.

18. The portable shelter of claim 16 wherein said foot rest is selectively vertically adjustably secured to said collar.

19. The portable shelter of claim 12 wherein a collar is secured to said forward end of said support member which has a vertical opening formed therein and wherein a cargo support structure is selectively removably secured to said collar for supporting cargo above the collapsed shelter frame assembly above said support frame.

20. A portable shelter for use with a vehicle, with forward and rearward ends, having a horizontally disposed first tubular hitch receiver which extends rearwardly from the rearward end of the vehicle, comprising:
a generally S-shaped drawbar having a horizontally disposed forward drawbar section with forward and rearward ends, an intermediate drawbar section with a lower forward end and an upper rearward end, which extends upwardly and rearwardly from said rearward end of said forward drawbar section, and a horizontally disposed upper rearward drawbar section with forward and rearward ends which extends rearwardly from said upper rearward end of said intermediate drawbar section;
said forward end of said forward drawbar section of said S-shaped drawbar being received in said rearward end of said first tubular hitch receiver;
a horizontally disposed base frame including:
  a. an elongated forward end frame member having first and second ends;
  b. an elongated first side frame member having forward and rearward ends;
  c. an elongated second side frame member having forward and rearward ends;
  d. said first end of said forward end frame member being secured to said first side frame member;
  e. said second end of said forward end frame member being secured to said second side frame member;
  f. at least one elongated cross-frame member having first and second ends with said first end thereof being secured to said first side frame member and with said second end thereof being secured to said second side frame member;
  g. a longitudinally extending center support, having forward and rearward ends, positioned below said forward end frame member and said cross-frame member;
  h. said center support being secured to at least one of said forward end frame member and said cross-frame member;
  i. said forward end of said center support being secured to said rearward end of said upper rearward section of said S-shaped drawbar;
a first hinge plate secured to said support frame adjacent said rearward end of said support frame at said first side thereof;
a second hinge plate secured to said support frame adjacent said rearward end of said support frame at said second side thereof;
a collapsible shelter frame assembly pivotally secured to said first and second hinge plates;
said collapsible shelter frame assembly being selectively movable between a horizontally disposed collapsed position and a shelter position over said support frame and rearwardly thereof; and
a flexible cover mounted on said collapsible shelter frame assembly.

21. The portable shelter of claim 20 wherein a collar is secured to said rearward end of said center support which has a vertical opening formed therein and wherein a horizontally disposed foot rest is selectively removably secured to said collar with said foot rest being positioned below said at least one seat member.

22. The portable shelter of claim 21 wherein said foot rest has first and second ends and wherein a stabilizer member is secured to each of said first and second ends of said foot rest.

23. The portable shelter of claim 21 wherein said foot rest is selectively vertically adjustably secured to said collar.

* * * * *